March 24, 1925. 1,530,682

G. LYMAN

WOODWORKING MECHANISM

Filed April 3, 1923 3 Sheets-Sheet 1

Inventor:
Gust Lyman

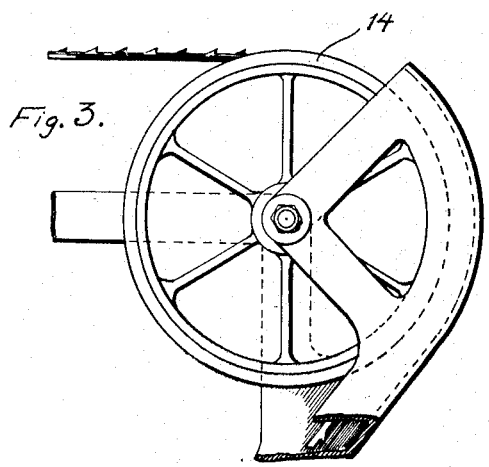
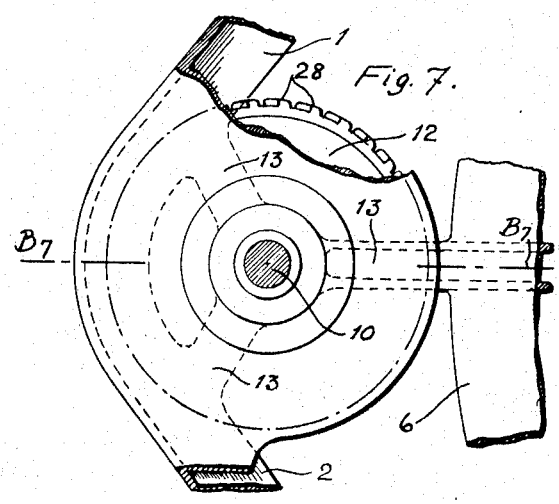
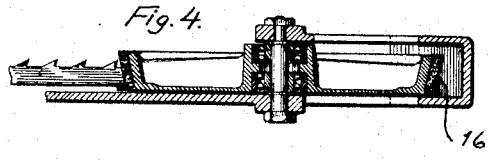
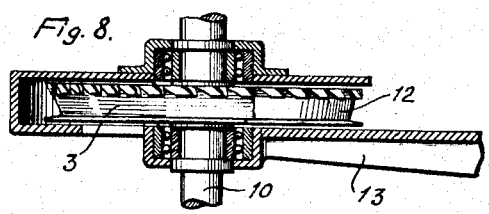
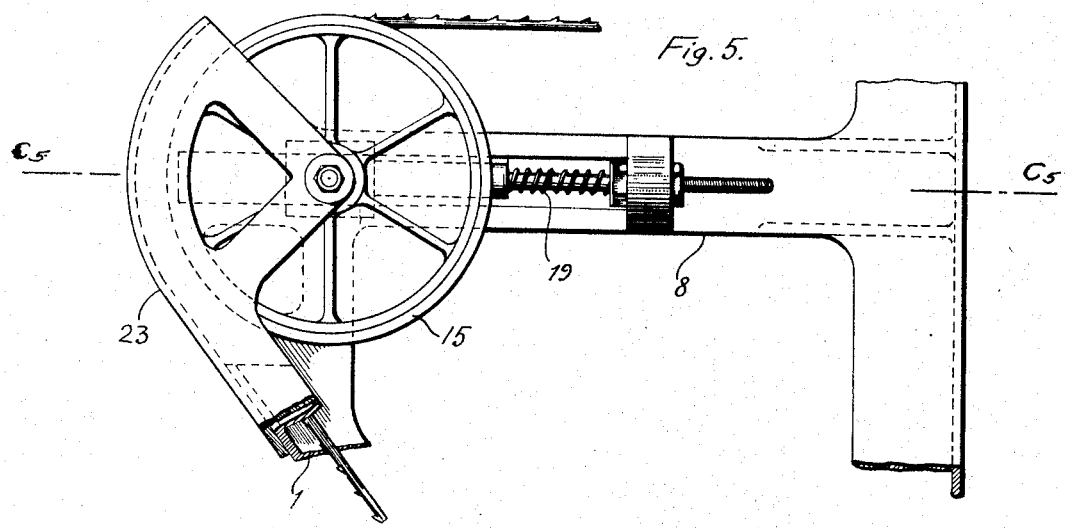
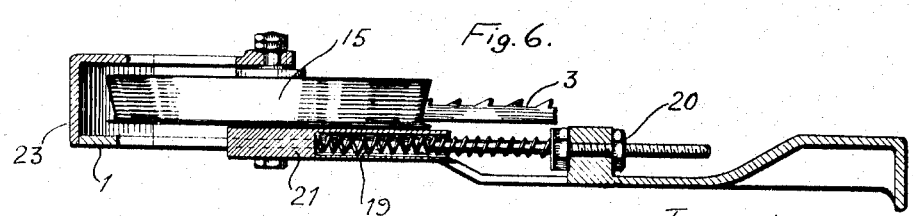

March 24, 1925.
G. LYMAN
1,530,682
WOODWORKING MECHANISM
Filed April 3, 1923     3 Sheets-Sheet 3
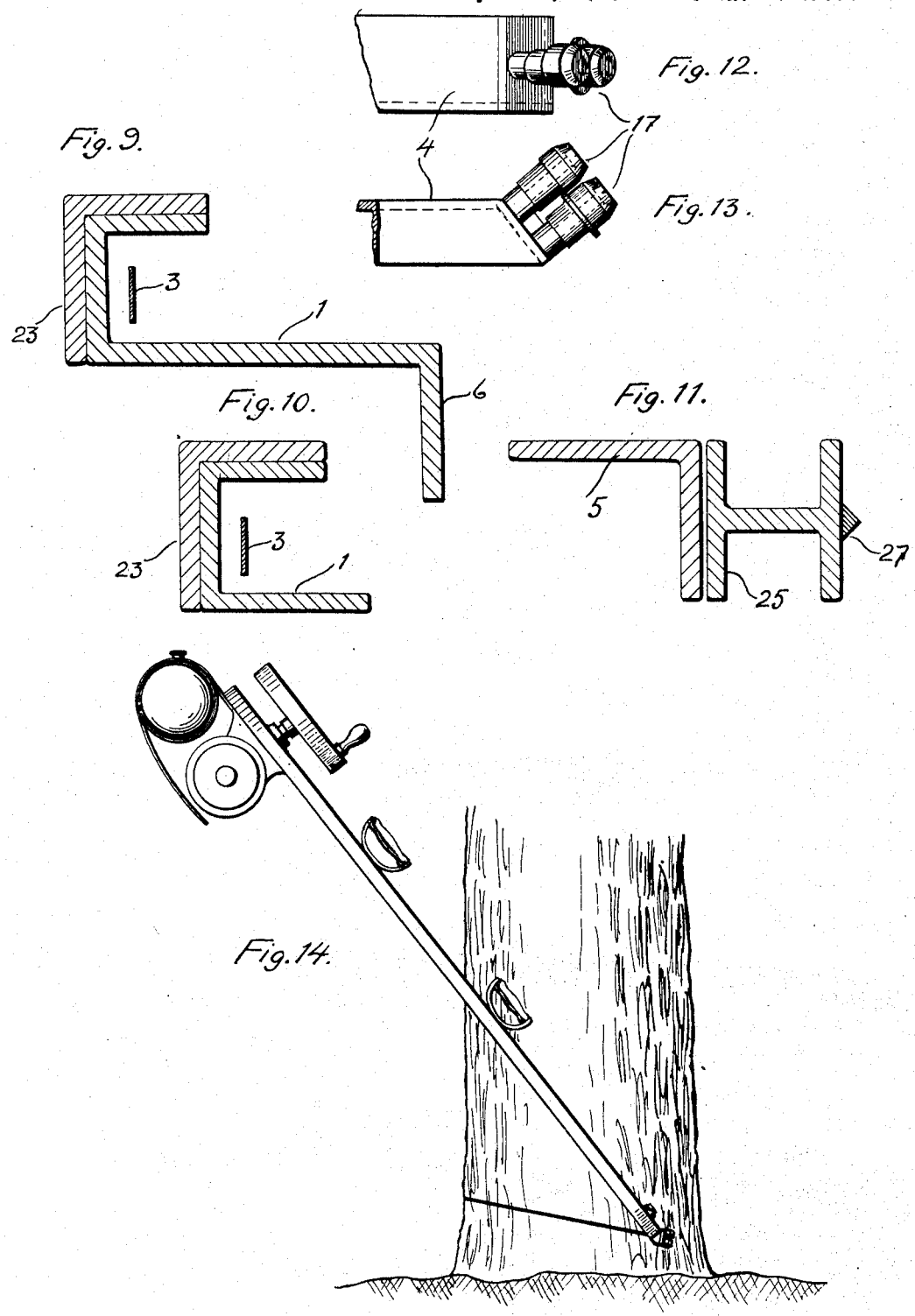
Inventor:
Gust Lyman Patented Mar. 24, 1925.

1,530,682

UNITED STATES PATENT OFFICE.

GUSTAF LYMAN, OF STOCKHOLM, SWEDEN.

WOODWORKING MECHANISM.

Application filed April 3, 1923. Serial No. 629,678.

*To all whom it may concern:*

Be it known that I, GUSTAF LYMAN, a subject of the King of Sweden, and resident of Sibyllegatan 44, Stockholm, Sweden, have invented certain new and useful Improvements in Woodworking Mechanisms, of which the following is a specification.

Figure 1:
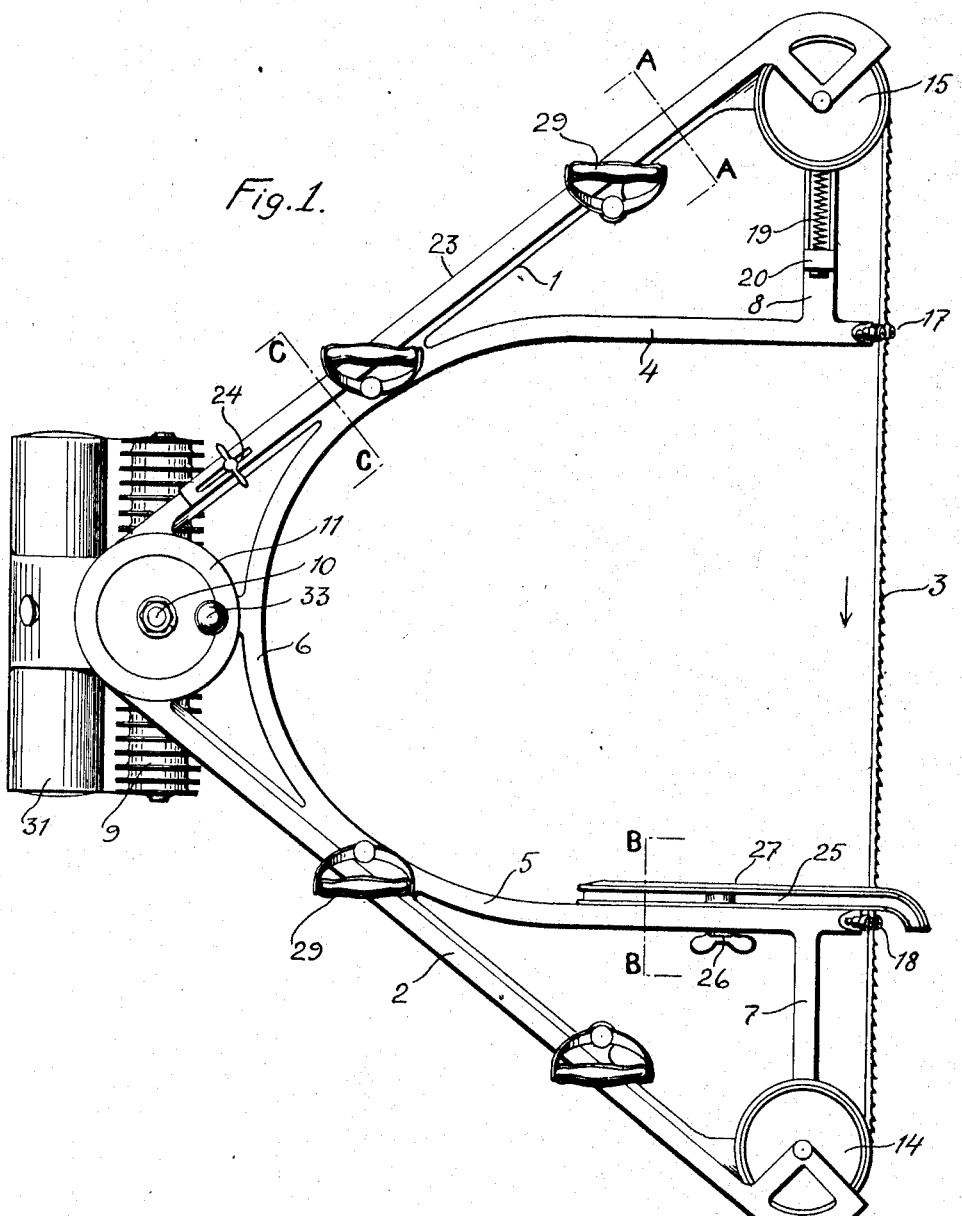
Figure 2:
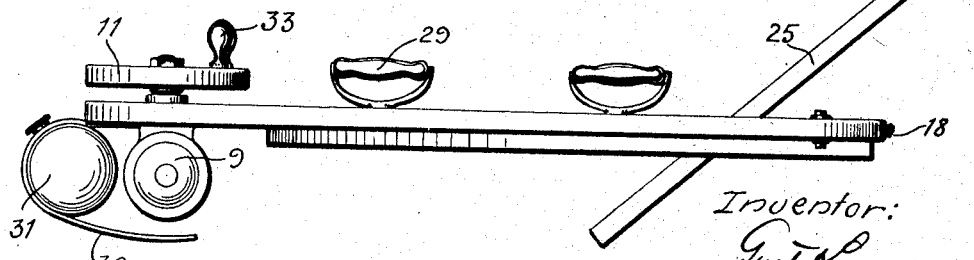

The invention relates to an apparatus for felling trees, cutting logs and the like, and more specially aims to provide a band saw arrangement, which is mechanically driven, and yet easily portable. With this and other objects in view, I carry out my invention as will be understood by the following description and accompanying drawings, in which:

Figure 1 is a plan and Fig. 2 a side view of a band-saw mechanism embodying my improvements. Fig. 3 is an enlarged view of a pulley used in the apparatus, and Fig. 4 a section through the same on the line $A^3$, $A^3$, in Fig. 3. Fig. 5 is an enlarged view of another pulley, used as a stretcher for the band-saw blade, and Fig. 6 a section through said pulley-arrangement on the line $C^5$, $C^5$ in Fig. 5. Fig. 7 is an enlarged view of my improved cog-wheel for driving the saw-blade, and Fig. 8 is an inverse section through the same on the line $B_7$—$B_7$ in Fig. 7, with the saw-blade in position. Figs. 9–11 show enlarged sections of the saw frame, viz, Fig. 9 a section on line C—C, Fig. 10 a section on line A—A, and Fig. 11 a section on line B—B in Fig. 1. Figs. 12 and 13 are enlarged views of a pair of guide-rollers as seen from above and from the side respectively. Fig. 14 is a side view of the apparatus in a position which it assumes in felling a tree. Similar numerals refer to similar parts throughout the several views.

The angle shaped saw frame consists of two parts 1 and 2, firmly attached to each other, and preferably made in one piece of a profiled metal-bar bent to a V-form. The bar may be made of U-formed sheet-metal, so as to form a protection for the saw-blade 3, as seen by Figs. 9 and 10, and at the same time obtain a form which is resistant against bending strains. To said bar is connected another bar 4, 5, 6, which in connection with the stays 7 and 8, forms a strong and yet light construction for supporting the elements hereinafter described.

In the corner formed by the parts 1, 2 and 6, the driving motor 9 is situated, its driving axle 10 carrying the fly-wheel 11 and a cog-wheel 12 for driving the bandsaw blade 3, as will be further described in the following. The axle runs in a bearing supported by the arms 13 connected to the saw-frame, the motor thus being carried on the frame by means of said arms 13 (Fig. 7).

The ends of the bar 1, 2 carry pulleys 14, 15, a strip of leather 16 preferably being placed round the periphery of said pulleys to prevent the saw-blade 3 to slip on the pulleys, which support and tension the same.

As seen by Fig. 14, the saw, when used for felling trees, is held in a position where its plane forms an angle of about 45° to the horizontal plane. As the trunk is to be cut nearly parallel to the ground, it will therefore be necessary to bend the sawblade 3, between the pulleys 14 and 15, an angle of about 45° out of its original plane, to make it run with its side parallel to the ground between said pulleys, when the frame is held in the position shown in Fig. 14. For this purpose the parts 4, 5 of the frame at their ends carry a pair of guiderollers 17, 18, which bend the saw-blade an angle of about 45° out of its original plane, as will be seen by Figs. 1, 12 and 13.

In order to strain the band-saw blade, and also to render it possible to insert blades of slightly different length, one of the pulleys, for instance the pulley 15, is slidably mounted in the stay 8, and held against the pressure of the saw-blade by a helical spring 19. The tension of the spring is adjusted by a screw and bolt arrangement 20. The lower end of the pulley-axle is fixed to the sliding member 21, and the upper end to the L-bar 23 (Figs. 1, 5, 6 and 10), which overlaps the part 1 of the frame, to which it is jointed by a pin and slot arrangement 24, in order to guide the yielding movements of the pulley 15.

A guiding bar 25, of the form shown in Figs. 1, 2 and 11, is adjustably mounted on the frame on one of the parts 4 or 5, to become pressed against the trunk by the reaction-force, formed by the friction of the saw-blade against the wood. If for instance the blade runs in the direction shown by the arrow in Fig. 1, the bar 25 is to be connected to the part 5 of the frame. By means of a clamping arrangement 26, the bar 25 may be adjusted to a fixed position with its elongation parallel to the plane of the cutting part of the saw-blade, in order to guide the movement of the saw-frame during the cutting operation, and prevent the saw-blade from being bent in any direction dangerous to its solidity. In order to make the connection to the trunk more firm, the guide-bar 25 may be provided with a sharp edge 27, or the like.

A special advantage in driving the saw-blade is made by using the above mentioned cog-wheel 12 for the purpose. As seen by Figs. 7 and 8, this wheel is provided with a number of cogs 28 round its periphery, said cogs acting against the back of the teeth of the saw-blade, which is hereby driven in a simple way without any possibility to slide, the arrangement heretofore used for the same purpose, consisting of apertures in the saw-blade, and pins on the driving wheel entering in said apertures thus being made unnecessary, the blade by the new arrangement keeping its full strength without any weakening openings or the like.

The frame is provided with handles 29, to be easily carried. With larger machines there may be used a pair of handles on each side, to render it possible for two persons to support the same, by smaller machines one handle on each side is sufficient, the machine in this case being easily manipulated by only one person.

30 designates a protecting shield connected to the fuel tank 31. The motor is started by turning the fly-wheel 11 with the handle 33.

I do not wish to be restricted to the details of construction being shown and described, as these may be modified in any particular parts, without departing from the spirit of my invention, but reserve the right to make such changes, variations and modifications as come properly within the scope of the protection prayed.

Having thus described my invention, what I claim as new and desire to secure by Letters Patent is:—

A pulley having a plane surface to engage the flat surface of a bandsaw and having a zone of cogs to engage and act against the backs of the teeth of said bandsaw.

In testimony whereof I affix my signature.

GUSTAF LYMAN.